Figure 1:
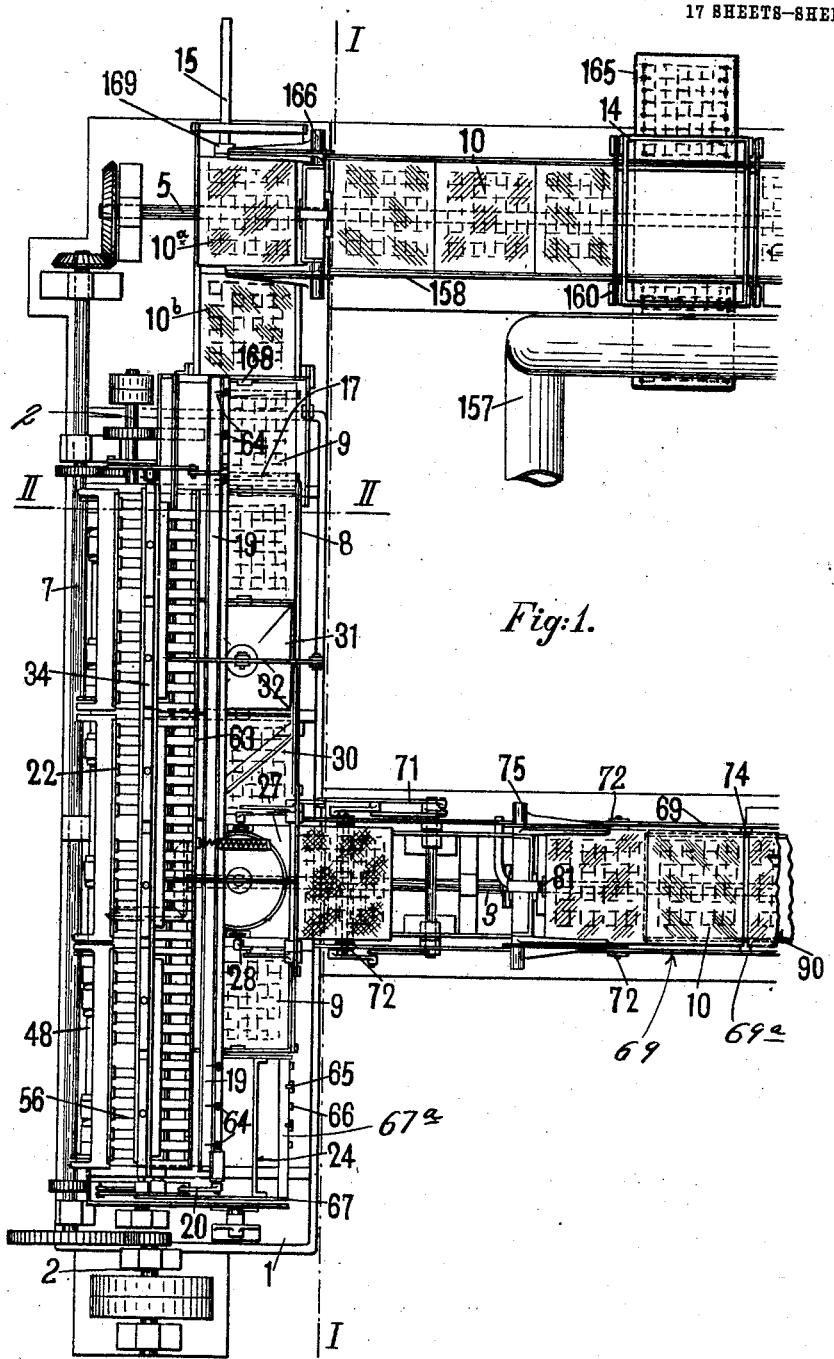

A. PAULSON.
MATCH MAKING MACHINE.
APPLICATION FILED MAY 21, 1908.
992,586.
Patented May 16, 1911.
17 SHEETS—SHEET 2.
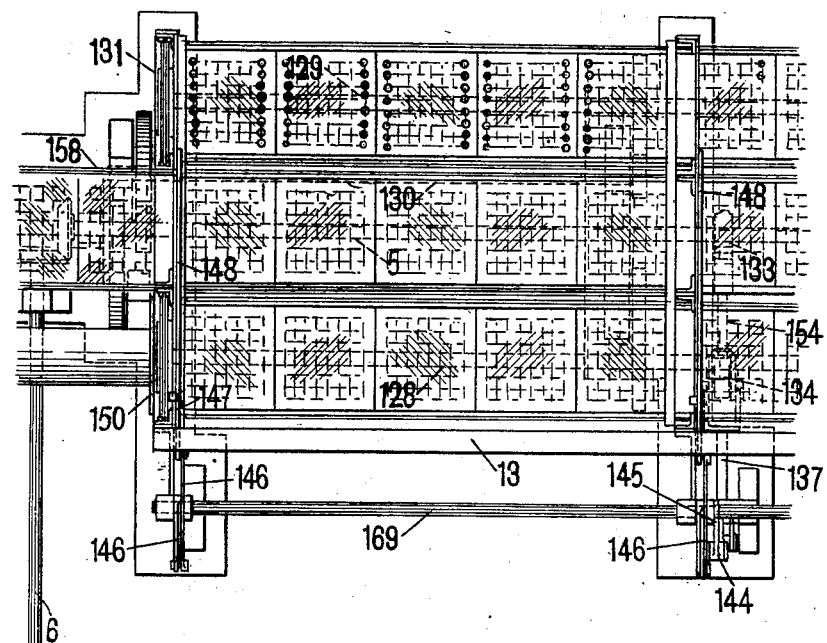
Fig. 2.
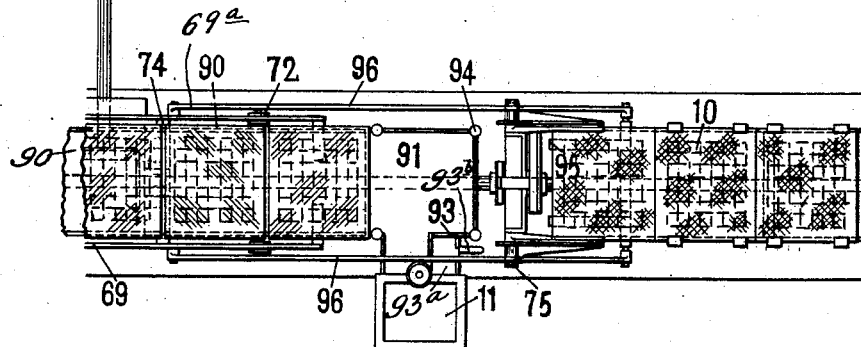
Witnesses
Inventor
Anders Paulson.
By James L. Norris.
Attorney

A. PAULSON.
MATCH MAKING MACHINE.
APPLICATION FILED MAY 21, 1908.

992,586.

Patented May 16, 1911.
17 SHEETS—SHEET 3.

Witnesses

Inventor
Anders Paulson,
By James L. Norris
Attorney

A. PAULSON.
MATCH MAKING MACHINE.
APPLICATION FILED MAY 21, 1908.

992,586.

Patented May 16, 1911.
17 SHEETS—SHEET 4.

A. PAULSON.
MATCH MAKING MACHINE.
APPLICATION FILED MAY 21, 1908.
992,586.
Patented May 16, 1911.
17 SHEETS—SHEET 6.
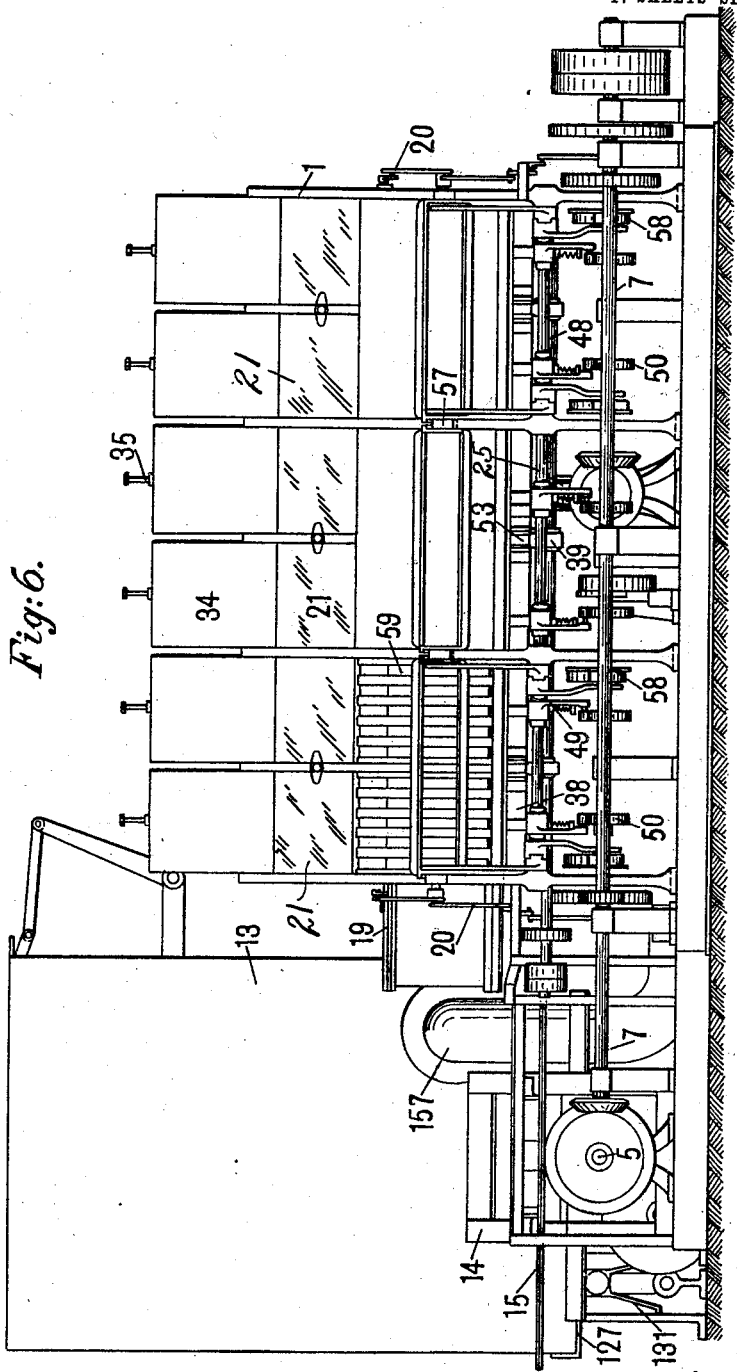
Fig. 6.
Witnesses
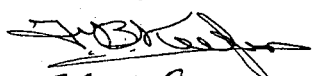
Inventor
Anders Paulson.
By James L. Norris.
Attorney

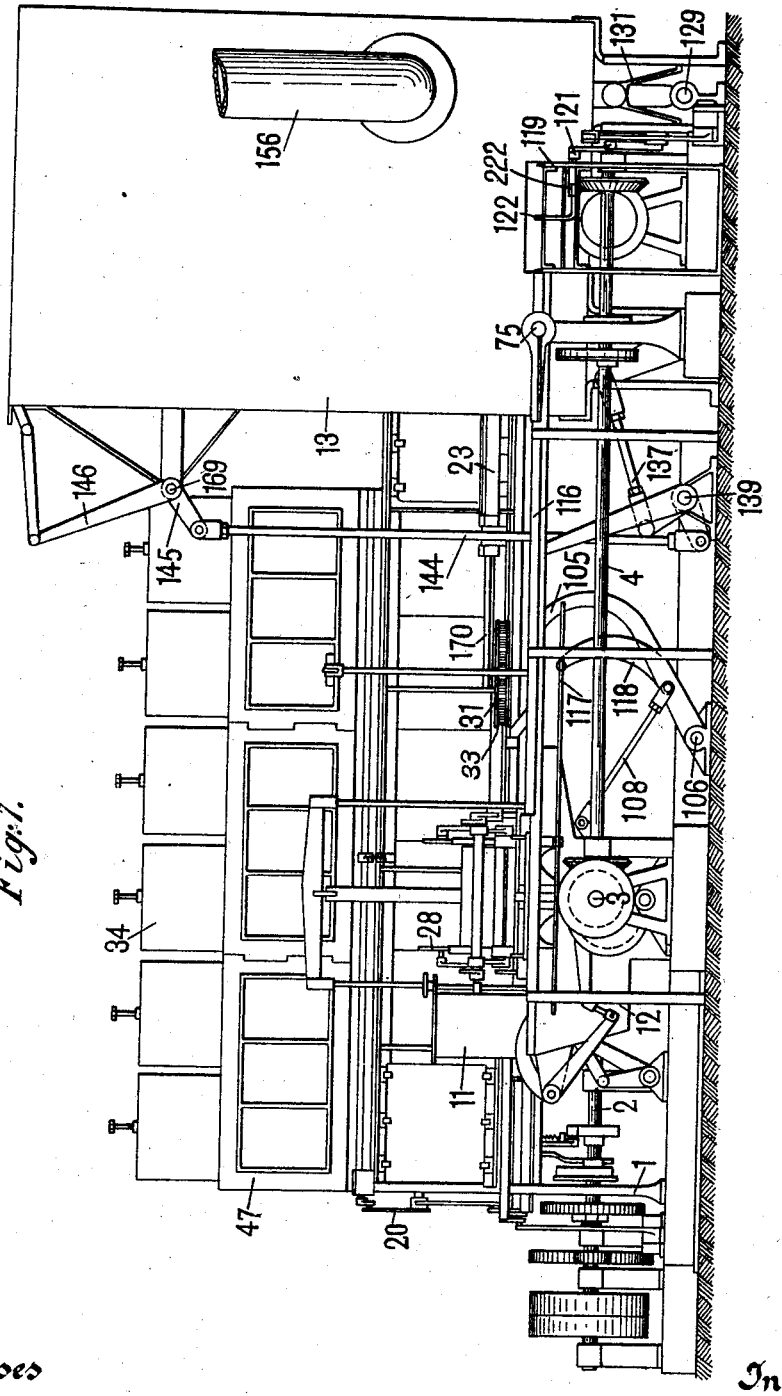

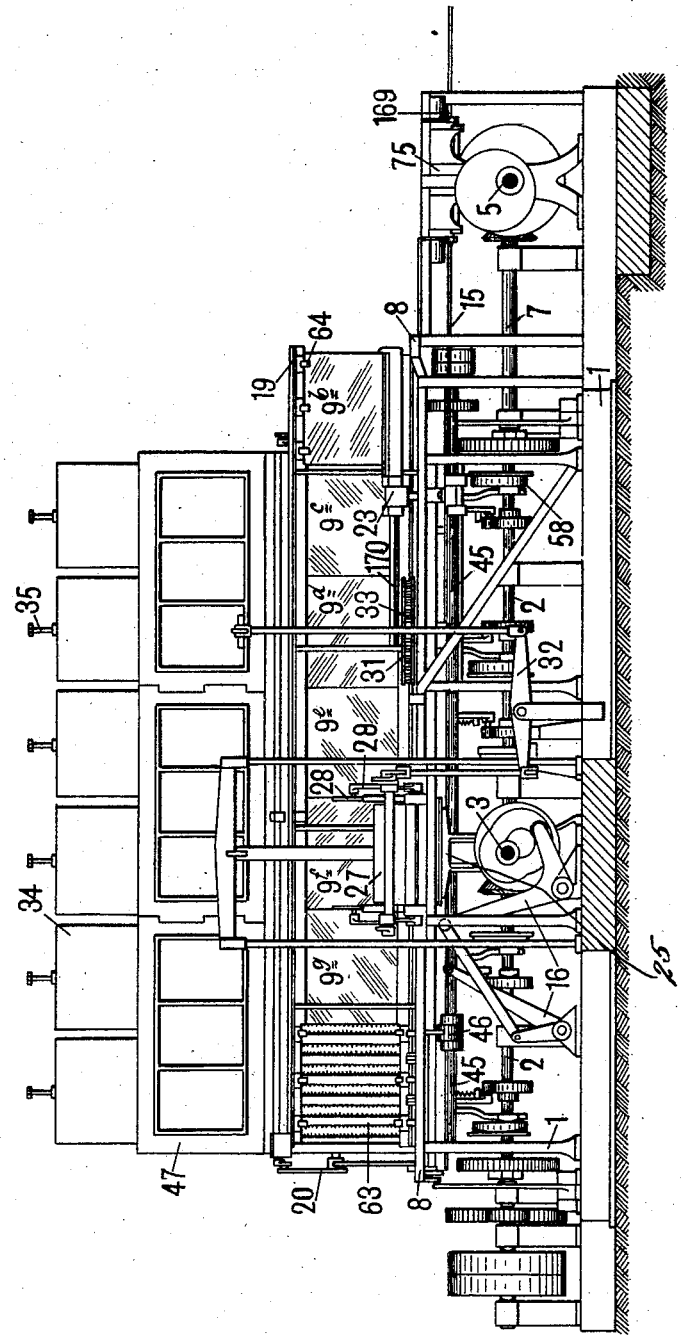

A. PAULSON.
MATCH MAKING MACHINE.
APPLICATION FILED MAY 21, 1908.
992,586.
Patented May 16, 1911.
17 SHEETS—SHEET 9.
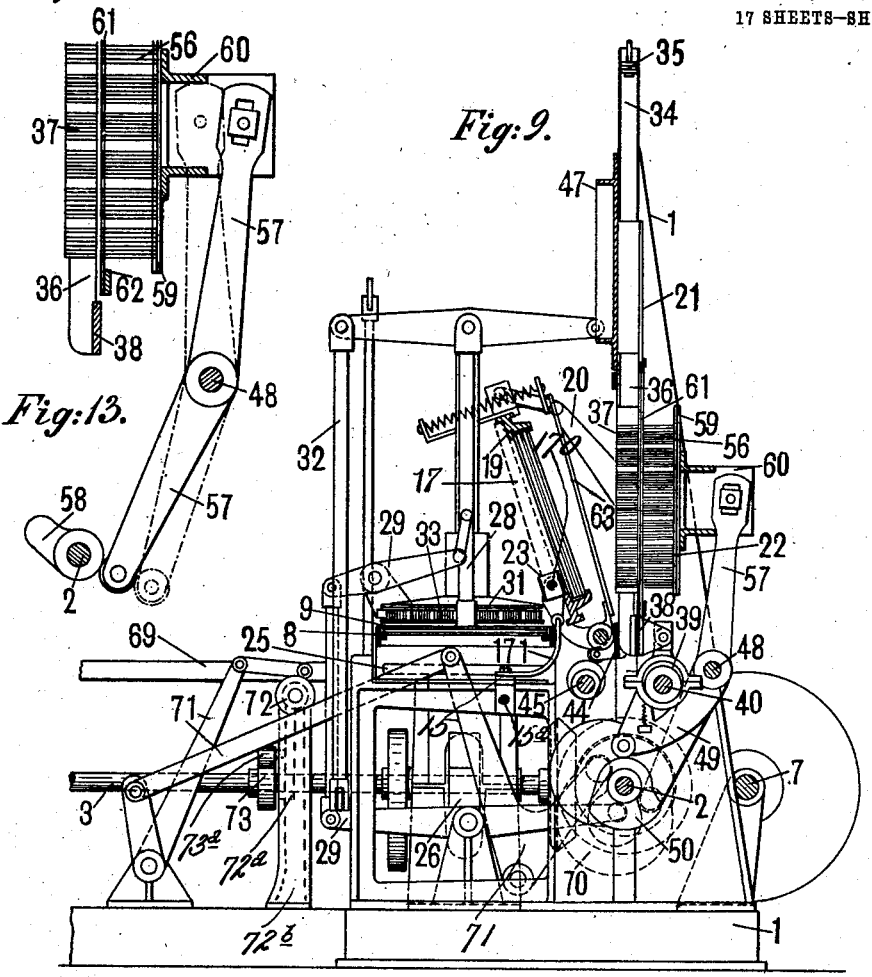
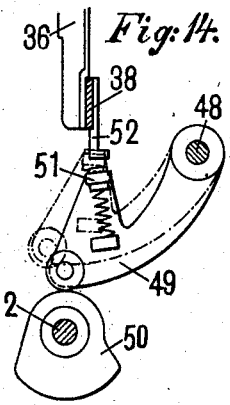
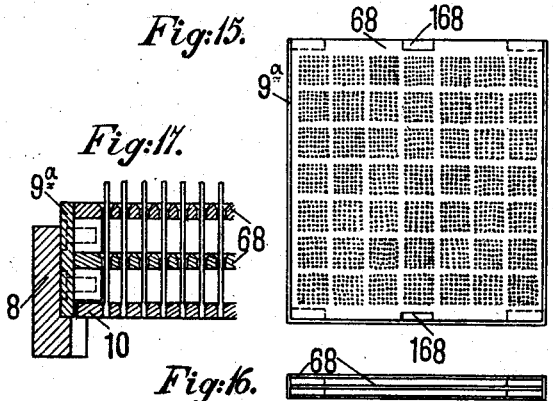
Witnesses
Inventor
Anders Paulson
By James L. Norris
Attorney A. PAULSON.
MATCH MAKING MACHINE.
APPLICATION FILED MAY 21, 1908.
992,586.
Patented May 16, 1911.
17 SHEETS—SHEET 10.
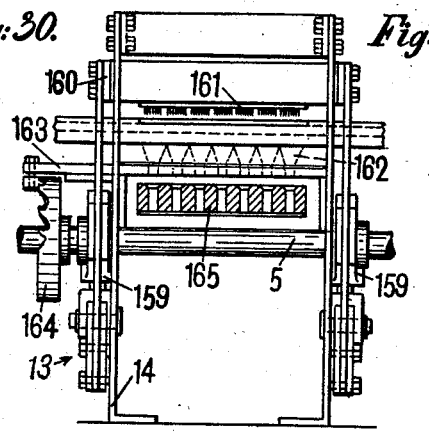
Fig:30.
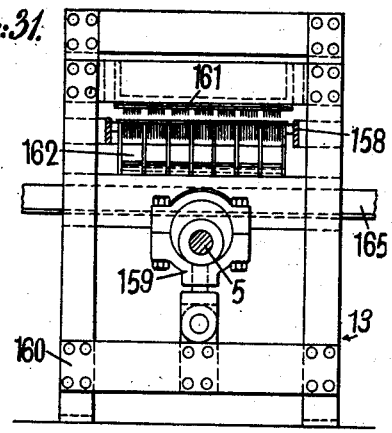
Fig:31.
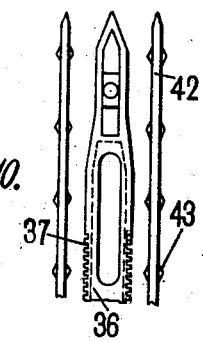
Fig:10.
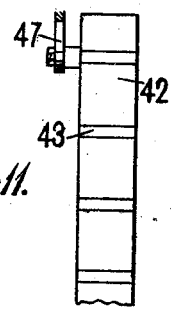
Fig:11.
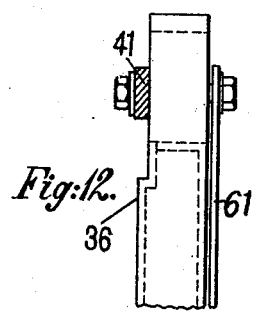
Fig:12.
Witnesses
Inventor
Anders Paulson.
By James L. Norris
Attorney A. PAULSON.
MATCH MAKING MACHINE.
APPLICATION FILED MAY 21, 1908.
992,586.
Patented May 16, 1911.
17 SHEETS—SHEET 11.
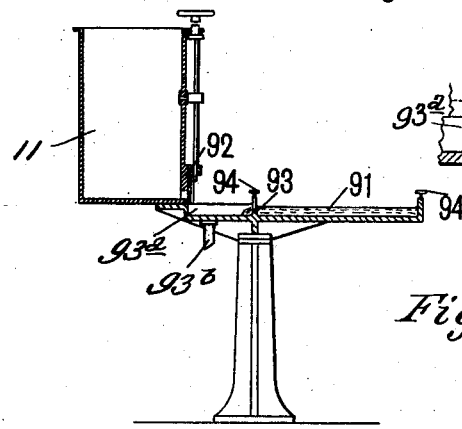
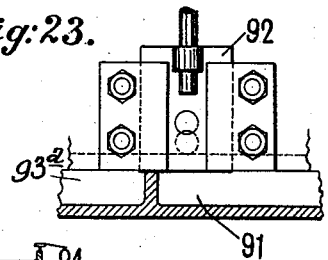
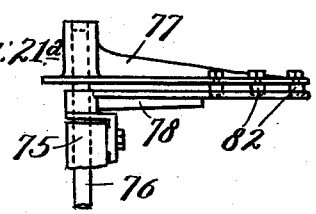
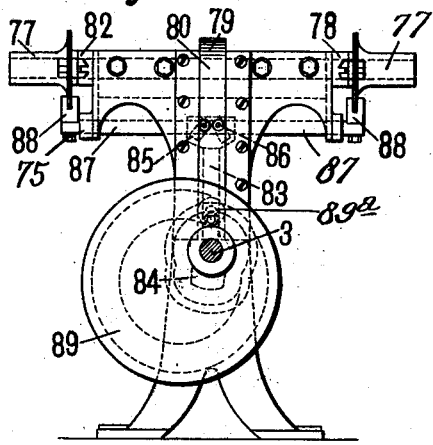
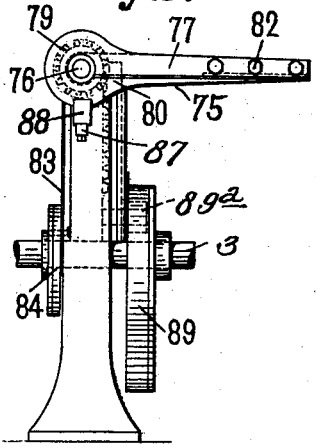
Witnesses
Inventor
Anders Paulson.
By: James L. Norris
Attorney A. PAULSON.
MATCH MAKING MACHINE.
APPLICATION FILED MAY 21, 1908.
992,586.
Patented May 16, 1911.
17 SHEETS—SHEET 12.
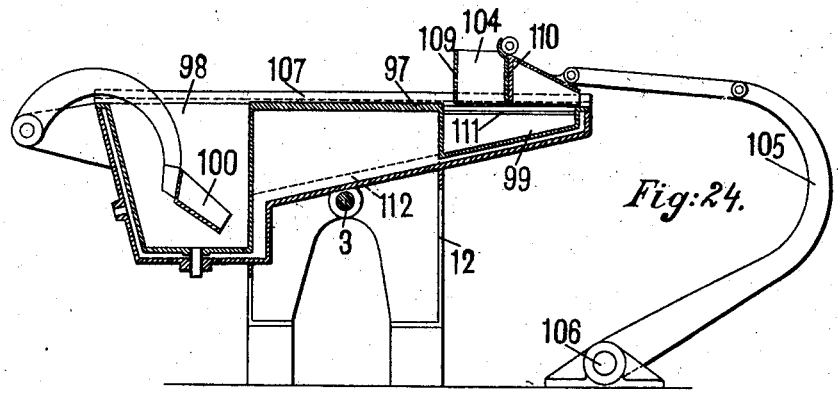
Fig:24.
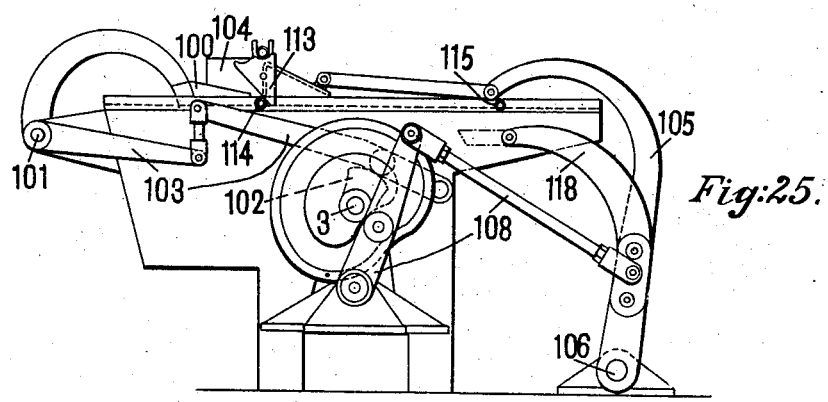
Fig:25.
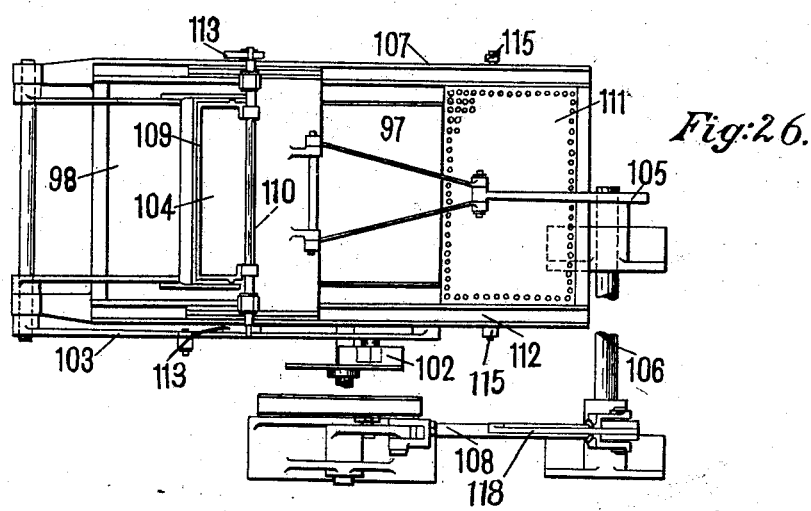
Fig:26.
Witnesses.
Inventor.
Anders Paulson,
By:
James L. Norris
Attorney.

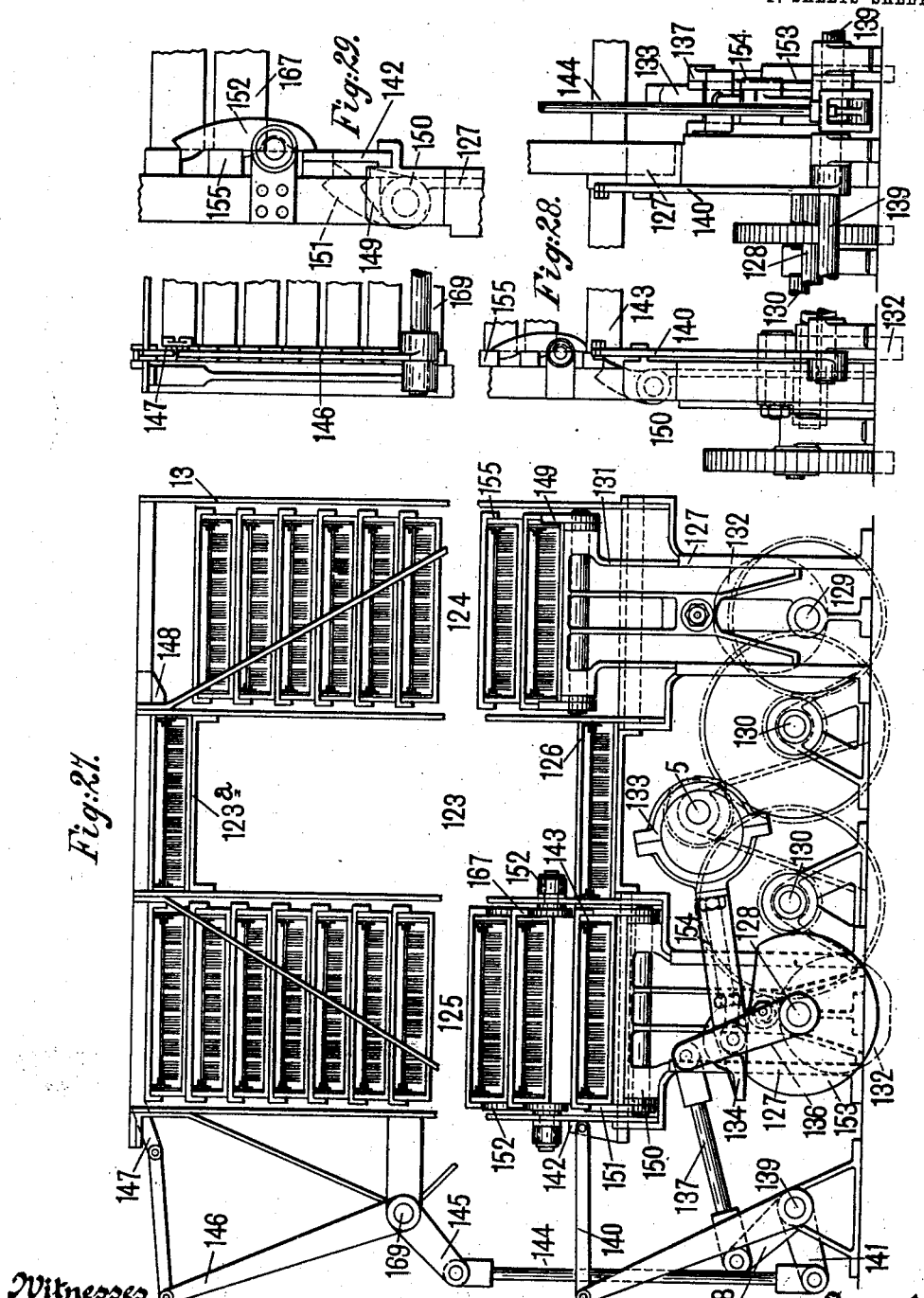

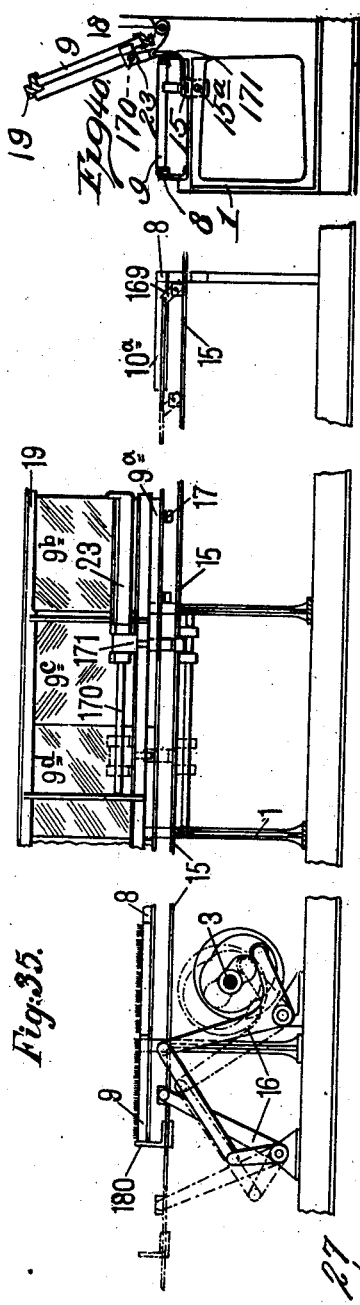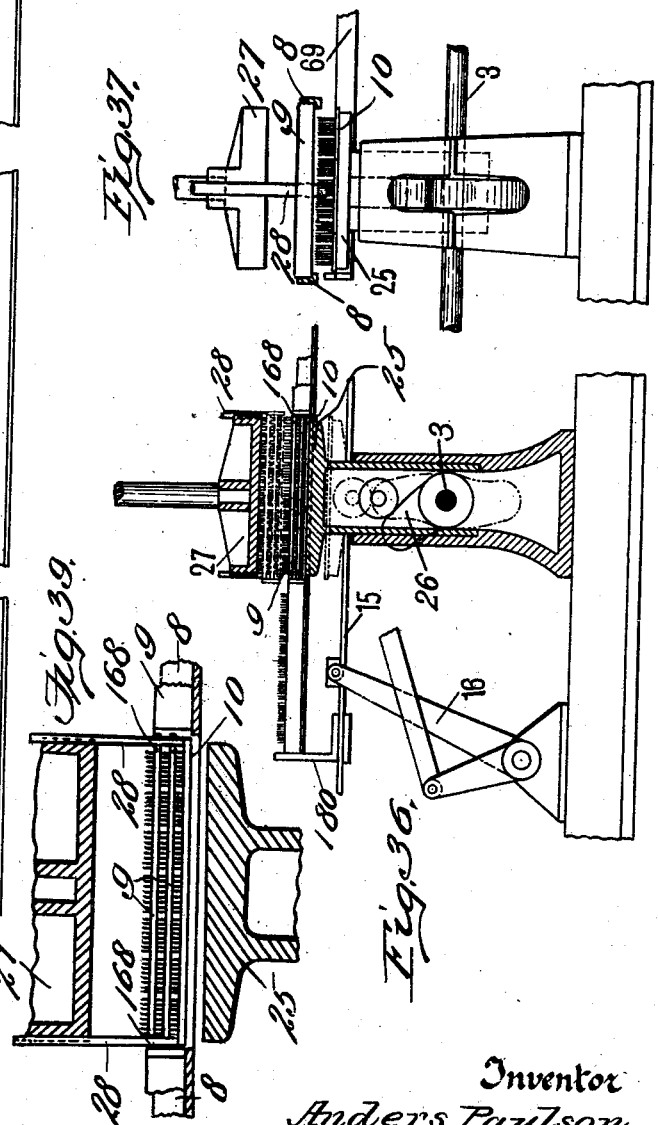

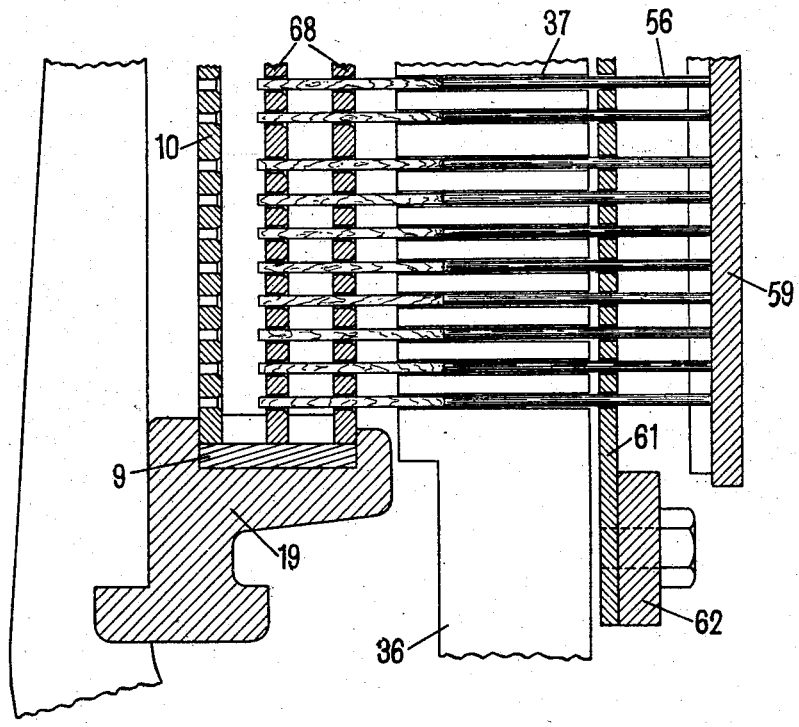

A. PAULSON.
MATCH MAKING MACHINE.
APPLICATION FILED MAY 21, 1908.
992,586.
Patented May 16, 1911.
17 SHEETS—SHEET 16.
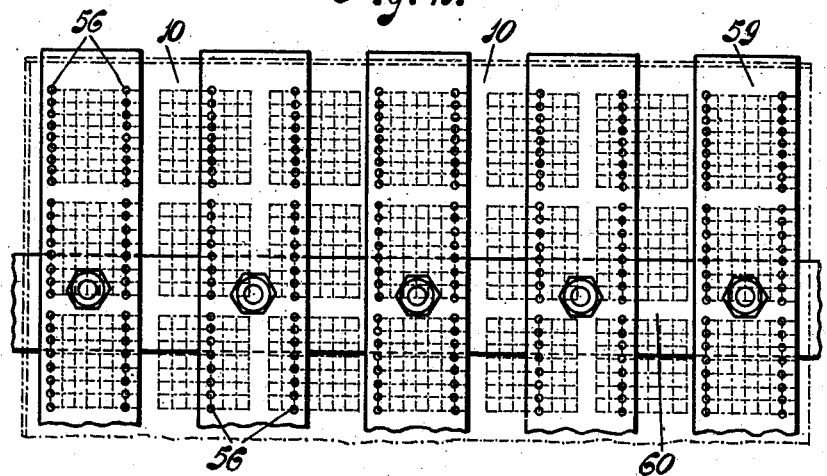
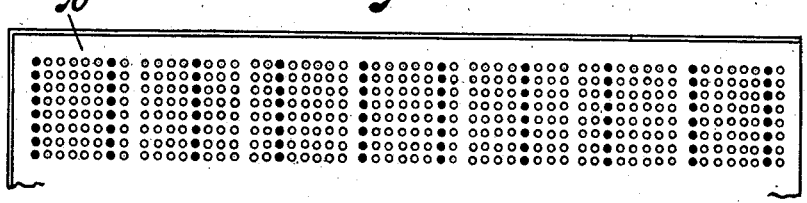
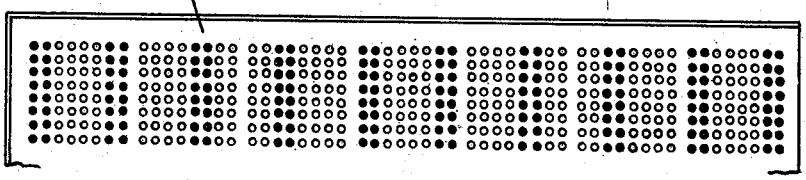
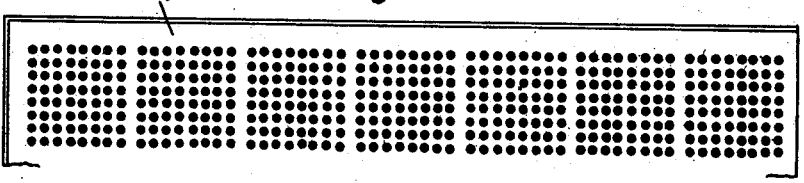
Witnesses
Inventor
Anders Paulson
By
James L. Norris Jr.
Attorney

A. PAULSON.
MATCH MAKING MACHINE.
APPLICATION FILED MAY 21, 1908.

992,586.

Patented May 16, 1911.
17 SHEETS—SHEET 17.

Witnesses

Inventor
Anders Paulson
By
James L. Norris, Jr.
Attorney

UNITED STATES PATENT OFFICE.

ANDERS PAULSON, OF BREDA, NETHERLANDS.

MATCH-MAKING MACHINE.

992,586.　　　　　Specification of Letters Patent.　　Patented May 16, 1911.

Application filed May 21, 1908. Serial No. 434,133.

*To all whom it may concern:*

Be it known that I, ANDERS PAULSON, a subject of the Queen of the Netherlands, residing at 34 Sophiastraat, Breda, in the Kingdom of the Netherlands, have invented certain new and useful Improvements in or Relating to Match-Making Machines, of which the following is a specification.

This invention relates to a machine for the continuous manufacture of matches, in which match splints are inserted into carrier plates, that are fed through the different mechanisms, as the filling, heating, paraffining, dipping, drying and ejecting mechanisms, and are returned to their initial position, where the working cycle recommences.

The general plan of the machine as a whole may be best gathered from the following brief statement of the operations which the elements thereof are constructed and organized to perform. The empty carrier plates coming from the ejecting mechanism, that is to say, after having completed their cycle, are introduced into frames at one side of the filling mechanism. The said frames are then guided in a vertical position along the filling device, the splints being inserted in rows into the carrier plates. As soon as the said frames arrive at the end of the filling mechanism, they are fed in horizontal position upon a quadrangular track which surrounds the several mechanisms. The carrier plates upon the track are fed beneath a presser plate which serves to drive the splints faster and deeper into the carrier plates in such a manner that they all project from the plate operated upon to the same extent, which is essential for their subsequent treatment. The filled plates are then removed from the frames by means of the ejecting mechanism, whereupon the plates continue their travel. The frames, after having been freed by means of a cleaning device from dust and from the fragments of splints remaining therein, are pushed back to the starting point of their cycle, in order to again receive at such point the empty plates coming from the splint ejecting mechanism. The filled plates continue their travel from the presser plate over a preliminary heater to a paraffining mechanism, and thence to a dipping mechanism. In order that the splints may take the position necessary for the different stages of their subsequent treatment, reversing devices located at various points on the track are employed. From the dipping mechanism, the plates are carried to a drier. Here they are carried in long frames which travel through a considerable distance in the drier, so that the heads of the matches are dried to the requisite extent. The plates are then led from the drying frames and are guided to a mechanism which ejects the matches from the plates on to a conveyer band leading to a box filling machine. The empty plates then begin afresh their cycle.

Figure 3:
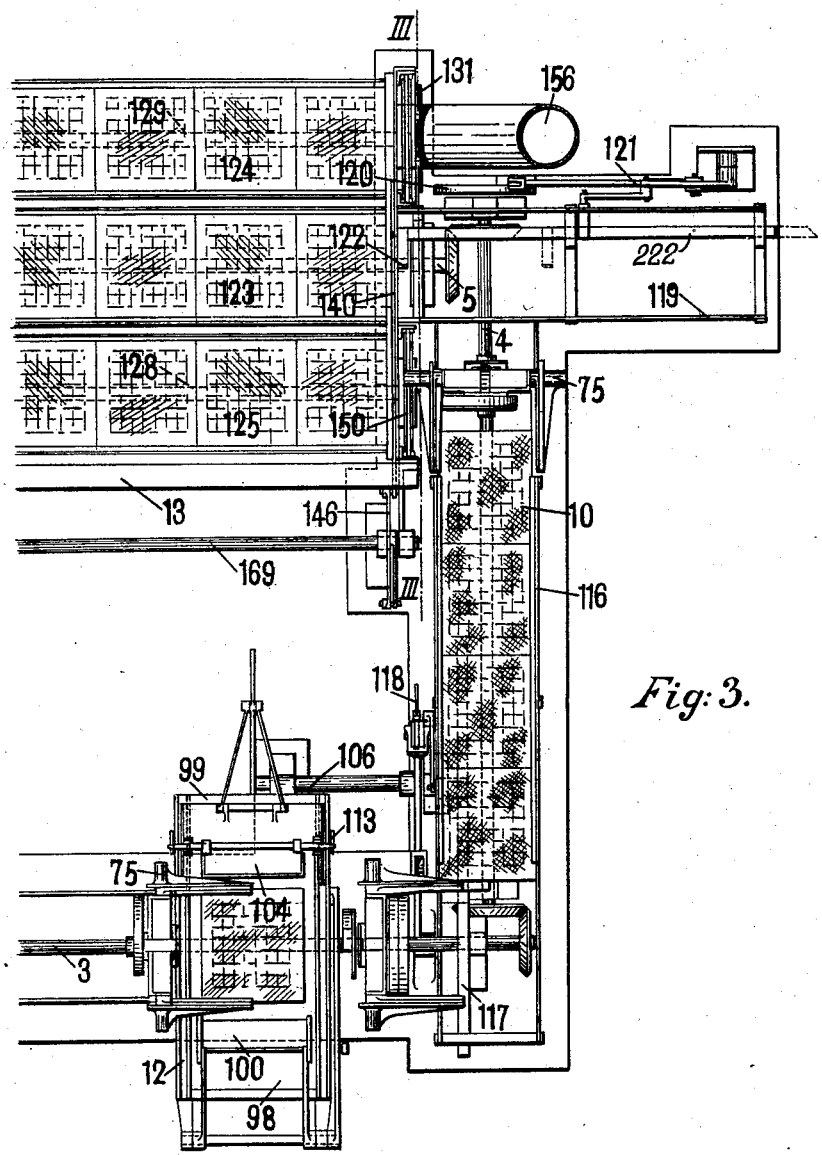
Figure 4:
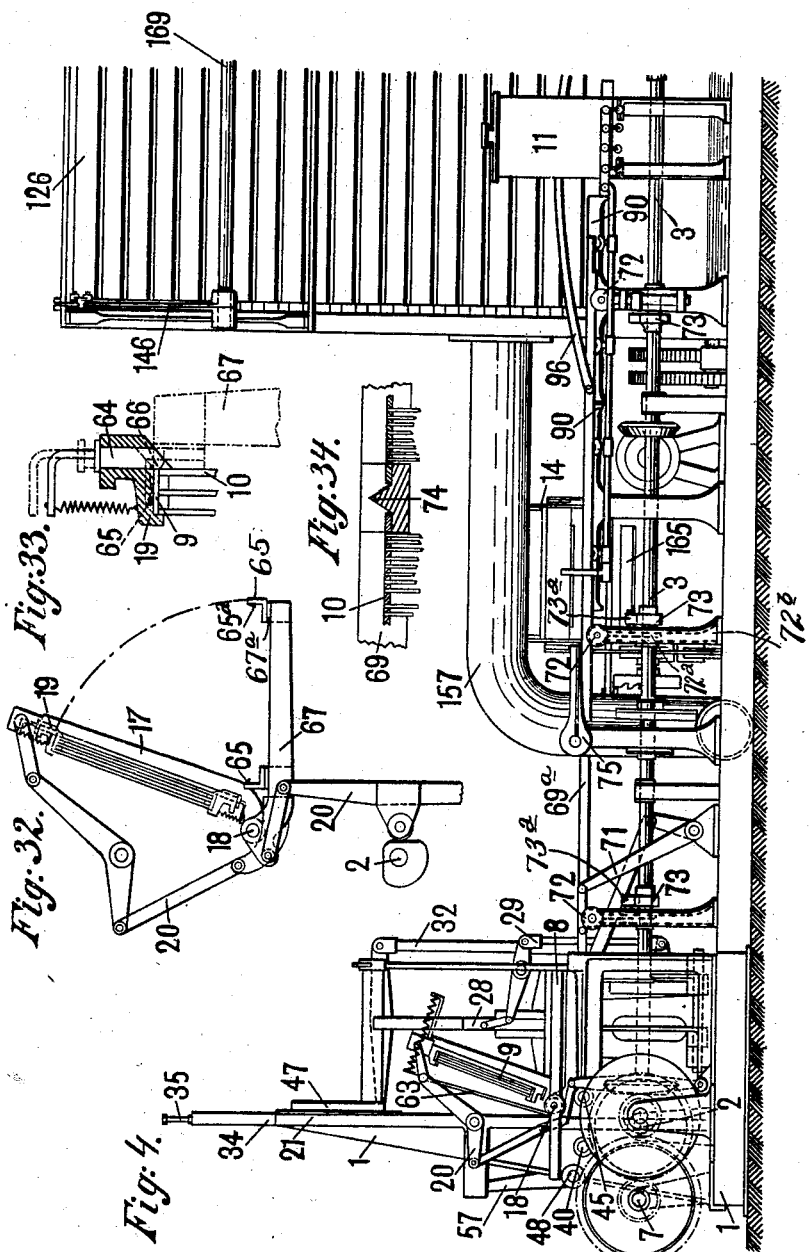
Figure 5:
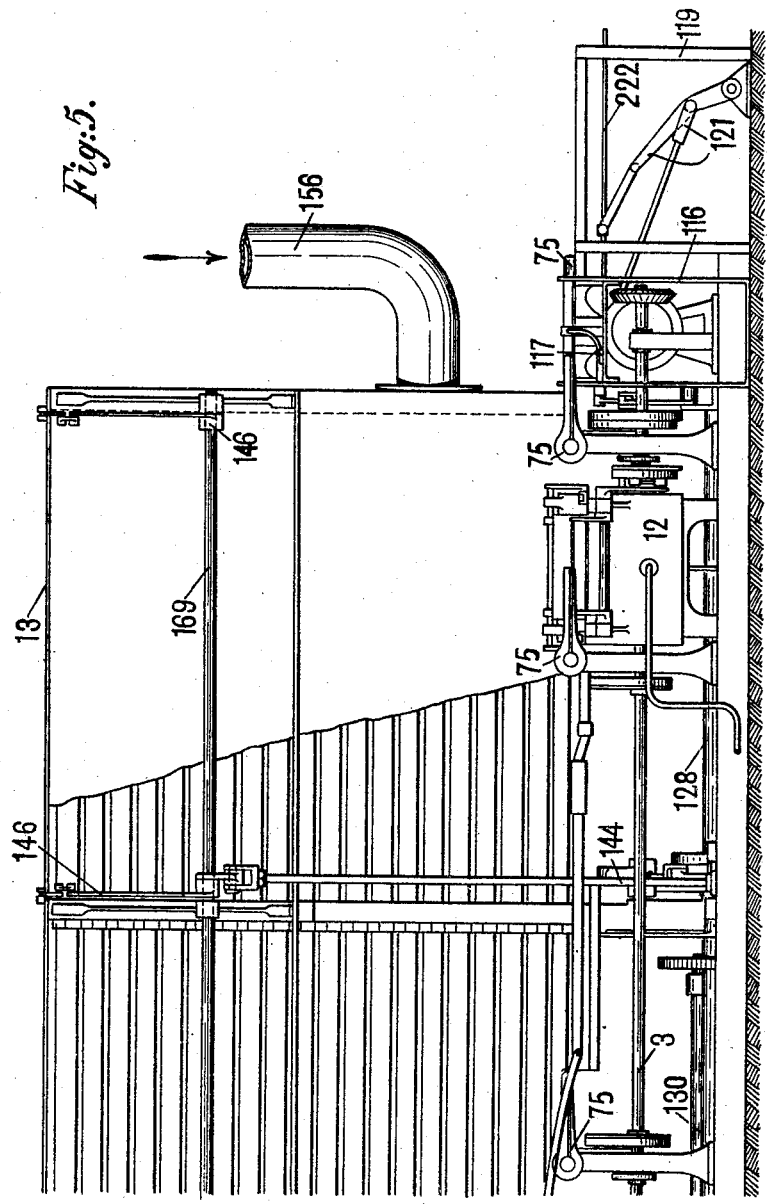
Figure 45:
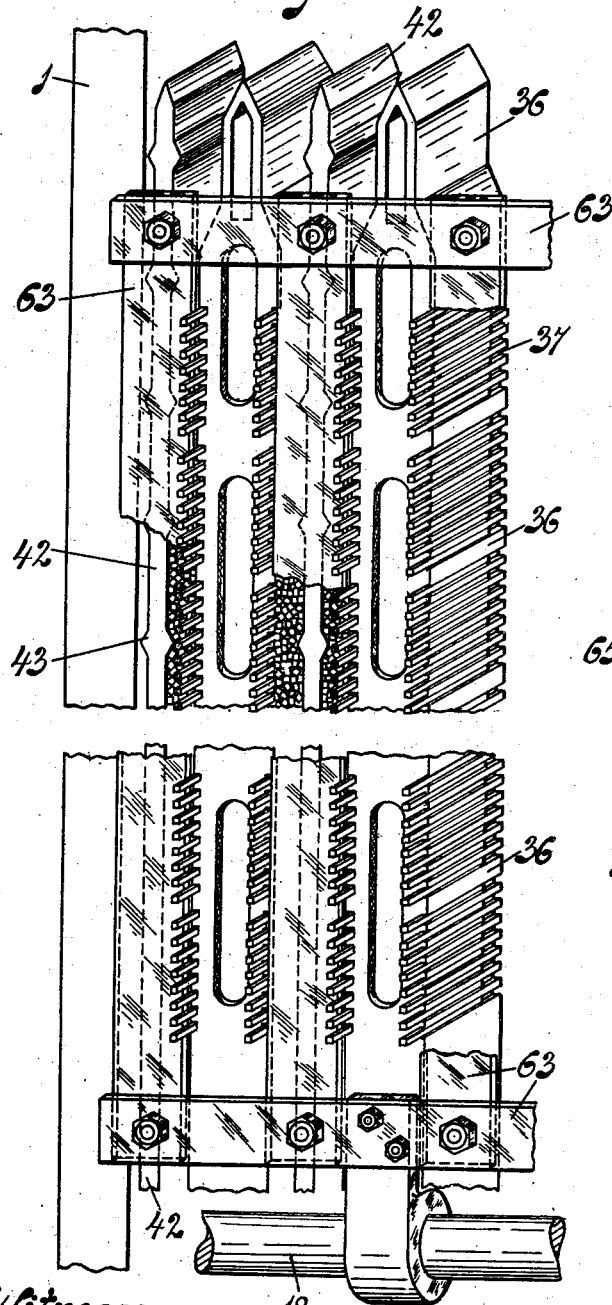
Figure 46:
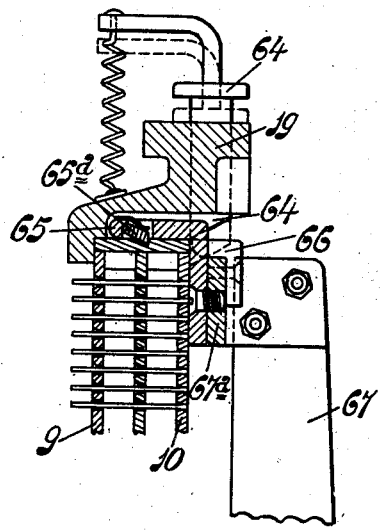

A machine constructed in accordance with this invention is illustrated by way of example in the accompanying drawings, in which:

Figures 1, 2 and 3 show the improved machine in plan. Figs. 4 and 5 in side elevation. Fig. 6 in front elevation, and Fig. 7 in rear elevation. Fig. 8 is a view of the filling mechanism complete seen from line I—I of Fig. 1. Fig. 9 is a vertical section through the filling mechanism on line II—II of Fig. 1, on an enlarged scale. Fig. 10 shows in detail the shaking or separator devices associated with the filling mechanism. Fig. 11 shows in detail one of the separator bars. Fig. 12 shows in detail a separator plate and parts of the frame, frame holder and inserting pins. Fig. 13 shows in detail the mechanism for operating the inserting pins. Fig. 14 shows in detail the means for temporarily locking the separator plates in their raised position. Figs. 15 and 16 show a frame with a carrier plate therein in plan and side elevation respectively. Fig. 17 is a fragmental sectional view of said frame and carrier plate. Fig. 18 is a front elevation, and Fig. 19 is a side elevation of a reversing device employed. Fig. 20 is a detail showing the arrangement of rack and slide employed in connection with the reversing mechanism shown in Figs. 18 and 19. Fig. 21 is a detail view showing a movable and a fixed reversing arm in contact with each other. Fig. 21ª is a detail view showing said arms out of contact. Fig. 22 is a cross-sectional view of the paraffining mechanism. Fig. 23 is a detail view of the regulating valve of the said paraffining mechanism. Figs. 24, 25 and 26 are, respectively, a cross section, side elevation and plan of the dipping mechanism. Fig. 27 is a partial front elevation of the drier viewed from line III—III of Fig. 3. Fig. 28 is a fragmental detail view of the right hand chamber of the drier. Fig. 29 is a similar view of the left hand chamber of the drier. Figs. 30 and 31 are front and side elevations of the ejecting mechanism. Fig. 32 is a detail showing the mechanism for rocking the frame holder and for shifting the frames. Fig. 33 is a detail view showing the spring pressed pins employed for retaining the frames in the frame holder. Fig. 34 is a detail view showing the knives attached to the feeding frame for the carrier plates. Fig. 35 is a detail showing the means for operating the feeding rod for the carrier plates and frames. Fig. 36 shows in detail a vertical central section through the pressing mechanism. Fig. 37 shows in detail a view of the press taken at right angles to Fig. 36, the presser plate being omitted. Fig. 38 is an enlarged sectional view illustrating the operation of the pins for inserting the splints in the carrier plates. Fig. 39 is an enlarged sectional view of the upper portion of the pressing mechanism in plane of Fig. 36. Fig. 40 is a side view of Fig. 35, showing the means for operating the feeding rod for the carrier plates and frames. Fig. 41 is a detail view showing a set of vertical plates provided with lateral pins located opposite a carrier plate. Figs. 42 to 44, inclusive, are detail views showing the upper portion of the carrier plate after the first, second and last insertion of splints by the filling mechanism. Fig. 45 is an enlarged fragmental perspective view of one of the magazines. Fig. 46 is a view similar to Fig. 33, but on a larger scale.

The machine as a whole will be best understood on referring to Figs. 1, 2, 3. As shown in these figures, the different mechanisms of the machine are arranged in substantially a quadrangle, while the track upon which the splint carrier plates travel to the said mechanisms forms, in effect, a closed quadrangle. Below the track and also below the different mechanisms the driving means, such as shafts, gears, levers, are mounted. To these driving means power is transmitted from an external source to the main shaft 2, that is mounted in a frame 1, carrying the filling mechanism, the said main shaft being connected by means of bevel gears to a shaft 3 which transmits its movement by way of bevel gears to a shaft 4, which, in turn, drives by means of bevel gears a shaft 5. For completing the quadrangle of shafts, a spindle 7 is mounted in the frame 1 and is connected by means of bevel gears to the shaft 5 and by means of spur gears to the main shaft 2. The shafts 3 and 5 furthermore are connected by way of bevel gears and a shaft 6. As will be clearly understood from Figs. 1, 2 and 3, the shafts 3 and 5, and the shafts 2, 7, 6 and 4, are arranged parallel with each other.

On the frame 1 and in front of the filling mechanism is arranged a quadrangular track 8 upon which perforated plates 10 are adapted to travel, into the perforations of which plates the match splints are to be inserted. These plates will hereafter be termed "carrier plates." In addition to these carrier plates 10, frames 9 are adapted to travel upon the track 8. The construction of these frames will be best seen from Figs. 15, 16 and 17. Each frame comprises two rectangular plates 68, which are perforated in the same manner as the carrier plates 10, and three side plates 9ª, the remaining side of the frame being open so as to permit of the insertion of the carrier plate 10. For this purpose, one of the two plates 68 is disposed at the top of the side plates and the other in the middle of the same, so that below the second plate a space remains for the carrier plate. Between the plates 68 and 10 and in the corner of the frame, distance blocks are disposed. At the open front side and the rear side openings 168 are arranged for a purpose afterward to be described.

The track 8 is extended at one end to such an extent that it can receive two empty carrier plates 10, designated 10ª and 10ᵇ in Fig. 1. The said plates are moved to the left (Figs. 8 and 35) by means of a lug 169 provided upon a feeding rod 15 which is driven from a cam on the shaft 3 by means of a series of levers 16. The extent of the endwise reciprocatory movement thus imparted to the rod 15 is equal to the length of a carrier plate 10 or a frame 9. When this feeding movement takes place a carrier plate 10ᵇ is pushed into a frame 9 which lies upon the track in front of said carrier plate. The said frame lies between two levers 17, which are pivotally mounted on a spindle 18 (Fig. 9) about which a frame holder 19 rocks. The frame holder 19 extends obliquely above the whole length and in front of the magazines 21 which receive the splints from tanks hereinafter referred to. As shown in Fig. 32, the frame holder 19 is fixed to a series of levers 20, that are rocked from a cam upon the main shaft 2, so that the frame holder rocks from the position shown in Figs. 4 and 9 to that shown in Fig. 12, To these levers 20, the levers 17 are also attached, so that on being swung upwardly, they carry the frame and with it the carrier plate, into the frame holder, the guide bars of which latter are cut away between the levers 17. But in order to grip the frame, spring pressed pins 64 (Fig. 33) are mounted on the said guide bars. When the frame is swung into the holder, it pushes back the said pins 64, as shown in dotted lines in Fig. 33. The levers 17 then move back to the track 8. The feeding rod 15 is provided with an arm 171 to which a bar 23 (Fig. 35) is attached and also with a plate slidable over the guide rod 15$^a$ to give the arm 171 greater stability. Bar 23 pushes the frame to the left, so that it now lies in front of the filling mechanism. In the same manner as described, other frames filled with carrier plates are brought into the frame holder and advanced by the reciprocating feeding rod 15 and the arm 23 attached thereto. When six frames, designated 9$^b$, 9$^c$, 9$^d$, 9$^e$, 9$^f$, 9$^g$, are engaged by the frame holder, the splints may be inserted.

The filling mechanism is provided with six tanks 34 arranged side by side directly above the magazines 21 and filled with wood splints (Figs. 6–9). At the top of the said tanks are arranged weights 35, the object of which is to press the splints downwardly in a uniform manner from the tanks into the magazines 21, (Fig. 9). Within the magazines are arranged shaking or separator plates 36 provided at both sides with grooves 37 of the size of a splint, (Figs. 10 and 45), and secured at their bottom ends, at definite intervals apart, to a slide block 38. The latter is given a vertical reciprocating motion by means of an eccentric 39 carried by a spindle 40. See Figs. 9, 10 and 12. The said spindle 40 is supported in the main frame 1 and is rotated in any well known manner. The separator plates 36 are guided at their upper ends by bolts which project through longitudinal slots formed therein, said bolts being secured to guide ledges 41. Midway between two separator plates 36 are arranged flat shaking or separator bars 42 provided with projections 43. These bars are arranged on a separate slide block 44 which is given a vertically reciprocating motion, by means of a cam 46 attached to a spindle 45. The separator bars 42 are guided at their upper ends by plates 47 which cover at the back the space between the tanks 34 and the magazines 21. In this manner, there are arranged in each magazine six separator bars and five separator plates.

The splints contained in the inserting device, are shaken by the vertically reciprocating separator plates and bars, whereby the splints will be separated and caused to enter the grooves 37 of said plates. When the frame holder with its frames is brought into the position shown in Figs. 12 and 38, the shaking movement of the separator plates 36 is stopped in the following manner: On a spindle 48, (Fig. 14), are arranged normally depending lever arms 49 which are raised by means of cams 50, secured to shaft 2. In Fig. 14 these arms are shown in full lines as occupying their lowest position. When the lever arms 49 are raised by the cams 50, a projection or finger 51 provided on each lever arm, strikes a stop 52, carried by the slide block 38 and will, therefore, hold said slide block in elevated position during the further rotation of the cams, as indicated in dotted lines in Fig. 14. Owing to such movement, a slide block 53 mounted in a bearing 54 on the block 38, (Fig. 12), will be raised along a pin 55 provided upon the eccentric 39, high enough to prevent the slide block 53 from coming into contact with the upper surface of said eccentric, so that said pin 55 will move up and down in the slide block without raising block 38, thus causing the shaking movement to be stopped. The separator plates 36 then take a position in which their grooves 37 are exactly opposite the perforations in the frames, which latter are located directly in front of the inserting device. The splints are then ejected from the grooves 37 and inserted in the frames by means of a series of adjustable vertical plates 59, each of which has fastened thereto a plurality of lateral pins 56, the number of said pins being exactly equal to that of the grooves. See Fig. 9. These plates 59 are secured to a block 60 and receive a reciprocating motion by means of lever arms 57, (Fig. 13), rotatable about spindle 48 through the medium of cams 58 secured to shaft 2, the upper ends of said arms being linked to said blocks. For the purpose of guiding the pins, there are provided flat grooved strips 61 (Fig. 13) connected at their lower ends to a strengthening plate 62, and at their upper ends to the bolts of the separator plates 36, (see Fig. 9). The shaking movement above described has the effect of causing the splints to move forwardly and to project in front of the separator plates. In order to push the splints back again into the magazines, there is provided a grate-like frame 63 which, as shown in Figs. 8 and 45, is composed of spaced strips so arranged that the spaces between the adjacent separator plates 36 are exactly closed by the said strips when the latter are pushed back again by the backward movement of the frame holder 19. In closing in this manner, the open side of the magazines, the strips of the frame 63 leave uncovered, however, the grooves 37 of the separator plates 36. See Fig. 45. Frame 63 is mounted on spindle 18, and is connected by a spiral spring to the frame holder 19. See Fig. 9. The magazines are closed at the rear thereof by means of plates 21 (Fig. 6), preferably constructed of glass. As there are six magazines and in each ten series of grooves 37, that is to say, five separator plates grooved on both sides, ten rows of splints will be inserted in each of the six frames at each movement of the pins 56. After ten rows of splints have been inserted into each frame, as shown in Figs. 41 and 42, the frame holder rocks away from the inserting device as above stated. At the same time, the frames in the frame holder are pushed to the left by the rod 15 and its bar 23, said bar gripping the rearmost frame and causing the latter to push all the other frames in the direction of its movement, whereby an empty frame is brought into position opposite the first magazine, while the last frame is removed from the holder in a manner subsequently described. The frame holder now rocks upwardly against the magazines and again ten rows of splints will be inserted into each frame, as shown in Fig. 43, and so on, until all the perforations of the frame are filled with splints. The perforations in the frames and carrier plates are so calculated and arranged that by the time a frame has been shifted along the face of the magazines by six movements of the feeding rod, the frame is full of splints. The form given to the groups of perforations is clearly shown in Figs. 15, and 41 to 44.
As will be seen from Fig. 43, the splints are inserted in the last row to the right of the carrier plate by the second insertion. Now, as the last row of pins in each of the remaining four of the six groups of plates 59, (i. e., the third, fourth, fifth and sixth groups), would find no opposite perforations in the splint plates, the last row of pins is omitted in the last plate 59 in each of the groups above specified. By so doing, each carrier plate will be completely filled after six insertions, and can then be taken, together with the carrier frame, from the frame holder and laid on track 8 by the reversing device 24 in the following manner: As will be seen from Figs. 1, 33 and 46, the frames are held by means of three spring-pressed pins 64. In order to release said pins, three fixed projections or fingers 66 are arranged on a cross bar 67$^a$ connecting the free ends of the arms 67 of the reversing device 24. Between the fixed fingers 66, there is also arranged on said cross-bar 67$^a$ a pair of fingers 65 provided at their ends with spring catches 65$^a$, (Fig. 46).
The reversing device 24 is driven from the main shaft 2 by means of the series of levers 20 employed for rocking the frame holder 19. When the reversing device 24 is raised by the levers 20, its fixed fingers 66 will contact with the inclined faces of the spring pressed pins 64 in the frame holder 19, and during the subsequent continued movement of said device they will force said pins outwardly, thereby releasing the frame contained in the frame holder. At the same time, the spring catches 65$^a$ of the fingers 65 are caused to enter recesses formed in the frame holder, so as to permit them to grip the frame, which latter is then turned over and deposited upon the track during the return movement of the reversing device.

On the opposite end of the feeding rod 15 from the lug 169 there is provided a lug 180, (Fig. 35), which lug is arranged to engage the frames during the reciprocation of said rod and to feed them toward the right. After three reciprocations of the rod, the frame deposited upon the track as above described is brought over a presser plate 25, to which a vertical reciprocatory movement is imparted by means of a cam 26, secured to shaft 3, as shown in Figs. 9, 36 and 37. The presser plate serves to fix the splints in the perforations in the carrier plates, which perforations are slightly smaller than those in the frames. For this purpose a flat plate 27 is arranged at some distance above the presser plate, so that upon upward movement of the presser plate all of the splints will be pushed into the perforations in the carrier plate to the same height. When the presser plate subsequently descends, the frame will be held by the bottom edges of the track, which edges, however, as shown in Figs. 17 and 39, are partly cut away in such a manner as to permit the carrier plate to be forced downwardly upon the presser plate. This is effected by means of slide bars 28 which are movable vertically in the recesses 168 in the frame, (Figs. 15, 36, 37 and 39), by means of levers 29 operated by a cam secured to the main shaft 2 Fig. 9, the arrangement being such that on the downward movement of the slide bars they will eject the carrier plate from its frame by simply pressing said plate downward and cause it to fall upon the presser plate 25 during the downward movement of the latter plate. Plate 10 then assumes the position shown in Fig. 37. The now empty frame is caused to continue its travel by means of the above mentioned feeding rod 15, in order to be subsequently cleaned from the fragments of splints remaining therein and from dust, the cleaning operation being effected as follows: The frame is first passed beneath a knife 30 arranged across track 8 and designed to cut off the projecting ends of the splints. (See Fig. 1). The frame is then passed beneath a cleaning plate 31 provided with depending pins 33, said plate having a vertical reciprocating movement imparted thereto by means of a series of levers 32 operatively connected to shaft 2. When this plate is moved downward, the dust and remnants of splints will be removed from the perforations in the frame by said pins. After having been cleaned, the frame continues its movement until it reaches its initial starting point, where it again receives a carrier plate and re-commences its travel. The carrier plate ejected from the frame now starts upon its travel along that portion of the track which is located above shaft 3, in the following manner: When the presser plate 25 reaches its lower position the carrier plate is advanced on the track toward a heater table 90, (Figs. 1 and 4), by means of a feeding frame 69 operated from the main shaft by a cam 70 and a system of levers 71, (Fig. 9), said frame comprising essentially a pair of parallel bars 69ª which rest upon rollers 72 on both sides of the heater table 90. At the end of the feeding frame is arranged a hook which engages behind the plate lying upon the presser plate. This frame rests on slides 72ª movable in three floor stands 73ᵇ and provided with the above mentioned rollers 72, which slides are given a vertical reciprocatory movement by means of cams 73 mounted on shaft 3. These cams engage rollers 73ª carried by said slides. The feeding frame therefore has an upward, forward, downward and backward movement, such movement being requisite for the subsequent treatment of the splints, as will be hereinafter explained. Up to this stage, the splints have been so arranged as to project upwardly from the carrier plates, and since such position must be reversed in order to permit the heating and paraffining operations, a second reversing mechanism, designated by the numeral 75, is employed for taking up a carrier plate as it passes beyond the pressing mechanism and turning it over. This mechanism comprises a standard wherein is supported a horizontal shaft 76 to each end of which is secured a set of coöperating reversing arms 77 and 78, (Figs. 18, 19, 20, 21 and 21ª), the two arms 78 being spaced apart a distance just sufficient to permit the carrier plates to be passed therebetween. The arms 77 and 78 at each end of shaft 76 are arranged adjacent each other, the arms 78 being fast upon said shaft, and serving to swing the carrier plates over when the shaft is turned, while the arms 77 are shiftable longitudinally of said shaft and toward each other, so as to grip said carrier plates. There is also mounted on this shaft a toothed wheel 79 engaged by a rack 80 which is slidable in a guide groove in the standard 75, (Figs. 18 and 19) and is reciprocated vertically by means of a grooved cam disk 89 eccentrically mounted on shaft 3, said cam engaging a roller 89ª secured to rack 80 thereby imparting a swinging movement to the arms 77 and 78, as will be apparent. For engaging and releasing the carrier plate, the shiftable arms 77 are provided with lateral forks 82 which project through openings formed in the arms 78 and grip the carrier plate when said arms 77 are forced toward each other, this position of arms 77 and 78 being illustrated in Fig. 21. To effect this movement of the arms in question there is mounted in the standard 75 at the opposite side from the toothed rack 80, a slide 83, (Fig. 20) to which is imparted a vertical reciprocatory movement by means of a cam disk 84 likewise secured to shaft 3. The enlarged upper end of the slide 83 has formed therein a pair of oppositely-inclined or diverging recesses 85 in which work a pair of rollers 86 connected to the inner ends of rods 87. These rods are provided at their outer ends with blocks 88 which engage annular flanges formed on the inner ends of the arms 77. (Figs. 18 and 19.) By reason of the particular inclination of the recesses 85, the downward movement of slide 83 will have the effect of moving rods 87 toward each other, thereby imparting a similar movement to arms 77, which latter and the rods 87 are forced away from each other when said slide moves in the opposite direction. This position, wherein the forks 82 are drawn entirely into the openings in the arms 78, is illustrated in Fig. 21ª. When a carrier plate is gripped between the forks 82 of the arms 77, said arms and the arms 78, on being operated, will turn the plate over and deposit it with the splints downward, in front of the heater table 90, (Fig. 1). After this operation has been completed, the plate is released by the forks being drawn outward and the arms 77 and 78 subsequently returned to their initial position by the continued rotation of the two cams just mentioned, the upward movement of the slide 83 causing the rollers 86 to move the rods 87 away from each other, whereupon the arms 77 are forcibly drawn away from the fixed arms 78; the movement of the rack 80 then rotates the toothed wheel 79, thereby imparting the requisite swinging movement to said arms, and returning said arms to their original position ready to receive the next carrier plate. The carrier plates, in their reversed position, are then forced onto the heater table 90 by means of a bracket 81 arranged on the feeding frame. This table has a recessed bottom, and its length is four times that of a carrier plate. It is heated at the bottom by a gas flame, so that the splints, as they pass thereacross, are heated to an extent sufficient to enable them to absorb paraffin when dipped into the paraffining trough 91 directly adjoining the table. In order to accurately arrange the carrier plates above the heater table in the exact position in which they must be placed in the paraffining trough, a series of four knives 74, (Fig. 34), are disposed upon both side rods of the feeding frame 69 in such a manner as to project between the mutually-adjacent ends of the carrier plates.

With reference to the paraffining mechanism, it may be stated that it includes, in addition to the trough 91, a supply tank 11 having a gate-valve 92 operated by a rod and hand-wheel, (Figs. 22 and 23). The trough itself is heated by a gas flame, to keep the paraffin in liquid condition, and is provided at its four corners with set-screws 94 upon which the carrier plate is arranged to rest, thus enabling the depth to which the splints are dipped to be regulated. The level of the liquid paraffin in the trough is maintained constant by means of an overflow device 93 over which the excess paraffin escapes into the compartment 93$^a$ (Figs. 2 and 22) from which it is afterward returned to the tank by means of the spout 93$^b$.

The heater table, as has already been stated, has a length of four times that of a carrier plate. Hence, when the machine, considered as an entirety, in being continuously operated, there will be four plates arranged above the table and one directly in the rear thereof, the last-mentioned plate being that one which has just been reversed, (see Figs. 1 and 2) and which lies in position to be engaged by the bracket 81. The first movement of the feeding frame is in an upward direction, and by reason of this fact the four plates directly above the heater table will be raised by the action of the knives 74. The first of these four plates is also engaged by lateral fingers with which the forward ends of the side rods of the feeding frame are provided, as shown in Fig. 2. The plate which lies between the arms of the reversing mechanism is engaged by the bracket 81 as stated above. The second movement of the frame is in a forward direction, and the extent of such movement is equal to the length of a carrier plate. When this movement takes place, therefore, the first or front plate of the series of four plates will be brought directly above the trough 91. The other three plates are then shifted one plate length to the right, (Fig. 1$^a$), and the plate coming from between the reversing arms 78 is pushed by the bracket 81 onto the heater table 90. The frame then moves downwardly, thereby depositing said plate upon the four set-screws 94 above referred to, and, in consequence, coating the free ends of the splints with paraffin. The remaining three plates of the series are deposited upon the heater table 90, next to the one coming from the reversing arms above referred to by the same movement of the frame, after which the latter again moves rearwardly. The carrier plate with the coated splints is then engaged by a second reversing mechanism 75 identical in construction and operation with that already described, the object of such reversal being to permit the paraffin to penetrate the splints to the proper extent. The reversed plate is then engaged by brackets 95 connected with the forward ends of a pair of bowed rods 96 arranged above the side rods 69$^a$ of the feeding frame 69 and attached thereto. As these rods 96 advance, they force the carrier plate forward along the track to the dipping mechanism 12, during which movement said plate pushes the plate directly in front of it in the same direction, the foremost plate, (i. e., the one treated), being turned over by a third reversing mechanism.

The dipping mechanism, as shown in Figs. 24, 25 and 26, comprises essentially a central paste-receiving plate 97, a dipping or supply tank 98 located upon one side of said plate, and a collecting tank 99 located upon the other side thereof, the two tanks being connected along the side edges of the plate by conduits 112 which are inclined toward the first-mentioned tank so that the paste dripping from the plate will return to the supply tank. The body portion of the mechanism is provided with a heating jacket. Paste is supplied to plate 97 by means of a ladle 100 carried by a transversely-arranged horizontal shaft 101, to which a rocking movement is imparted through levers 103 and a grooved cam 102, the latter being secured to shaft 3. Simultaneously with the operation of the ladle, a scraping and spreading device 104 is reciprocated across the paste plate, said device being operated by a curved lever 105 connected therewith and mounted upon a second rock shaft 106 operated likewise from shaft 3 by levers 108. The movements of the several cams and levers are so timed that when the ladle reaches the limit of its upward movement, the device 104 is disposed exactly thereon, as shown in Fig. 25. This device includes a fixed spreading plate 109 located at the front end thereof, and a vertically movable scraper plate 110 in the rear of the first named plate. The arrangement of these parts is such that when the scraper plate is lowered and the device is moved to the right, the plate 109 will spread the paste evenly over the paste plate.

The movements of the scraper plate 110 are effected by means of rockers 113, shown in Fig. 25, arranged on both sides of the device 104 and pivoted to the ends thereof. These rockers which are each provided with a pair of recesses formed upon the upper edges thereof at different distances from the pivots, are disposed outwardly of the sides of the dipping machine, and the scraper plate is provided at its upper corners with pins adapted to rest in said recesses. The dipping machine is likewise provided with pairs of rollers 114 and 115 located upon opposite sides thereof and lying in the path of the rockers, the arrangement being such that when the device 104 is at the limit of its left-hand movement the two pins above referred to rest in the lower recesses in the rockers and remain in that position during the movement of said device to the right until the rockers strike the rollers 115, whereupon they are turned over and the pins shifted into the upper recesses, the scraper plate being thus raised, as will be understood. When device 104 again moves to the left, the pins remain in the upper recesses until the rockers are again reversed upon contacting with the rollers 114. Owing to this arrangement, the scraper plate will not touch the paste upon the paste plate during the movement of device 104 to the left. But when said device moves in the opposite direction, the scraper will strip the paste from the paste plate and will carry the same into the collecting tank 99, while the plate 109 will remove from the ladle the fresh supply of paste contained therein and will spread it evenly over the paste plate. Thus there is no opportunity for the paste to become foul, since fresh coatings are constantly applied to the paste plate while the paste already used is removed therefrom. The collector tank is provided with a sieve 111 which is located therein and serves to screen the stripped paste and to separate out the dust and other impurities, the screened paste returning to the supply tank through the conduits 112.

The inverted carrier plates, with their paraffined splints, are successively deposited upon the paste plate by the adjacent reversing mechanism 75 as the device 104 reaches the limit of its movement to the right. At the same time, another reversing mechanism engages the inverted and treated carrier plate released from the other reversing mechanism, and deposits it in normal position upon the right hand section 116 of the quadrangular track below which section shaft 4 is arranged. See Fig. 3. Along this track section the plates are fed by a rod 117 driven by means of a lever 118 arranged on the curved lever 105 above referred to, the splints projecting upwardly so as to permit the paste to concentrate upon and adhere firmly to their upper ends. The plates, on reaching the end of the track section in question, are successively transferred by a reversing mechanism (similar to those already described), to the track section 119 arranged above shaft 5. From this point they are fed through the drier 13 by a rod 222 having a bracket 122, said rod being driven by means of levers 121 connected thereto and operated by a cam disk 120 secured to shaft 5. (Fig. 3.) The drier comprises three compartments or chambers 123, 124 and 125 of equal length, for instance, ten times that of one of the carrier plates, these compartments being supported upon standards 127. The two end compartments 124 and 125 are designed to be completely filled with drying frames, each consisting of three rectangular brackets 155 arranged behind each other and two side plates which carry the guides that engage the edges of the carrier plates, the side plates being attached to the short arms of said brackets. The top, bottom, and front and rear sides of the frames thus formed are open. The drier is closed on all sides, there being, however, ingress and egress openings for the carrier plates which latter are forced into the central chamber 123. These chambers have a common bottom plate, so that a frame may be shifted from one chamber to another. The central chamber is provided also with a false top plate $123^a$, (Fig. 27), across which a frame may likewise be shifted. This chamber is normally empty, with the exception of the frame upon the false top $123^a$ and that upon the bottom plate, the latter frame receiving the in-coming carrier plates, which are fed along the track 119 by the bracket 122.

Shaft 5 which is arranged below the drier, as above stated, drives through the medium of spur gears a pair of parallel shafts 130 which, in turn, drive in a similar manner a second pair of shafts 128 and 129 arranged below the chambers 125 and 124, respectively, as shown in Fig. 27. Each of the shafts last mentioned carries an eccentric 132 which imparts a vertical reciprocatory movement to a frame carrier movable within the adjacent chamber. The carrier 150, which works within chamber 125, is designed to lower the frames therewithin, while the carrier 131 serves to elevate the frames within the chamber 124 within which it works.

To effect the requisite movement of the carrier 150, there is attached to shaft 5 an eccentric 133 whose rod 154 is provided at its free end with a crank 134 engaged by a roller 135 (Fig. 27) secured between a pair of spaced parallel levers 136 loosely mounted at their lower ends upon shaft 128. Upon this shaft there is also mounted a cam 153 which engages the above mentioned free end of the eccentric rod 154. The upper ends of levers 136 are connected by a rod 137 with a lever 138 secured to a horizontal rock shaft 139, which shaft has also attached thereto a system of levers 141 connected by vertical rods 144 with levers 145 secured to a rock shaft 169 located above and parallel with shaft 139 and journaled in a bracket fastened to the adjacent end wall of the drier. Shaft 169 carries a second system of levers 146 having pusher bars 147 connected thereto. These bars are guided in the top portion of the drier and are provided at their free ends with lugs 148 adapted for engagement with the uppermost frame in chamber 124. A second system of levers 140 is also attached to rock shaft 139. These levers are provided with presser blocks 142 which are guided in recesses in the adjacent standards 127 and engage the side plate of the lowermost frame in the chamber 125. Carrier 131 is further provided with pivoted pawls 149, and carrier 150 with pawls 151, said pawls being adapted to bear upwardly against the short arms of the brackets 155, of the lowermost frames as hereinafter explained. Pivotally mounted pawls 152 are also provided at the front and rear ends of the chamber 125. Each pawl 152 is formed with a pair of projections arranged for engagement with the corresponding bracket arms of the two frames next above the frame engaged by the pawls 150.

The operation of the various parts associated with the drier and recently described, may be stated as follows: The reversing mechanism 75 located at the point of intersection between the track sections 116 and 119 inverts the carrier plates and transfers them from the former to the latter track section. The plates are then introduced through the ingress opening in the drier by means of the feeding device 122—222, and are forced into the frame designated 126 upon the bottom of the central chamber 123 of the drier, said frame preferably containing ten plates. This operation takes place as the cam 153 completes its revolution, whereupon the crank 134 carried by the eccentric rod 154 will drop over and engage the roller 135, said crank being bowed for that purpose, as clearly shown in Fig. 27. The movement of the eccentric 133 will then serve to rock or swing levers 136 to the right, whereupon the system of levers 140 will be swung in the same direction, the presser blocks 142 carried by said levers 140 forcing the recently filled frame 126 from the chamber 123 into the chamber 124 and the lowermost frame 143 from the chamber 125 into chamber 123, the separate reference numerals 126 and 142, applied to the particular drier frames, as well as other numerals subsequently employed in the same connection being made use of in order to facilitate an understanding of the travel of the frames through the drier. Simultaneously with the above described movement of the levers 140, the pusher bars 147 are moved to the right so as to permit their lugs 148 to engage behind the right-hand side plate of the then uppermost frame in chamber 124. On the return movement of these bars, their lugs drag said frame onto the false top plate 123$^a$ of chamber 123, thereby pushing the frame already on said plate onto the then uppermost frame in chamber 125. The cycle of movements of the frames, therefore, is such that a frame fitted with freshly dipped splints is first introduced from chamber 123 into chamber 124, then gradually raised step by step until it reaches the top of said chamber, whereupon it is shifted across plate 123$^a$ into chamber 125, then lowered step by step, and then returned to chamber 123. Finally the carrier plates, with their splints in a perfectly dry condition, are removed from the frame by the in-coming fresh plates, and are deposited upon the ejecting mechanism 14. As above stated, the operation of the levers 140 is effected by means of the levers 136 which, in turn, are operated by the crank portion 134 of the eccentric rod 154. This rod is engaged by the cam 153 which serves to elevate said rod, and thus effect the disengagement of its crank from the above-mentioned roller, thereby rendering the levers 137 and 140 inoperative, as will be apparent. During this period of disengagement, ten carrier plates are introduced into the empty frame 126. The gear connections between shafts 128, 129 and 5 are, therefore, so proportioned that the last-mentioned shaft makes ten revolutions to one revolution of the first-mentioned shaft.

The operation of the several pawls 149, 151 and 152 in connection with the frames and carriers in the two main compartments may be stated as follows. During the introduction of the carrier plates into frame 126, the carrier 131 in chamber 124 is raised so as to engage its pawls 149 with the lowermost frame in said chamber, and to raise all of the frames therein a distance above the bottom plate equal to the height of one frame. When frame 126 has been filled, it is forced into chamber 124 by the movement of the lowermost frame (143) of chamber 125 into chamber 123, the frame 167 and the succeeding frames in chamber 125 being supported by the pawls 152. Carrier 131 is then lowered, whereupon the frames above frame 126 rest upon the latter frame, the pawls 149 being disengaged therefrom upon the continued downward movement of the carrier. The carrier 131 is then raised, carrying with it all of the frames in chamber 124, the uppermost frame being brought to a position where it can be shifted onto the plate 123$^a$ by the bars 147, and thence into chamber 125. Frame 167 in the chamber just mentioned is directly engaged, as already stated, by the pawls 152, upon the lower projections of which it rests. See Fig. 29. This frame is released upon the upward movement of the carrier 150, whose pawls 151 engage said frame, pushing back pawls 152 (to the left, with respect to Fig. 29) and thus releasing them from engagement with frame 167. These pawls are so mounted as to normally swing forward, (to the right with respect to Fig. 29), and hence when the carrier subsequently moves downward, they will engage the two frames next above frame 167, the latter frame moving into the position formerly occupied by frame 143. On reaching this position, frame 167 will be released from engagement by pawls 151 as carrier 150 continues its descent, and will be shifted into chamber 123 by the subsequent movement of levers 140 in the manner already described.

The drier is completely inclosed, with the exception of the ingress and egress openings, and is heated by air introduced thereinto through a pipe 157 and discharged from a pipe 156.

The carrier plates on leaving the drier are caused to advance across a table 158 provided with lateral guides, continuing their movement until they reach the ejector mechanism 14 where the downwardly directed splints are removed from the plates. This mechanism, as shown in Figs. 30 and 31, consists essentially of a frame 160 to which a vertical reciprocatory movement is imparted by means of a pair of eccentrics 159 carried by shaft 5 and connected with the bottom members of the frame. In the upper portion of the frame there is located an ejector plate 161 provided with a plurality of depending pins, there being as many pins as there are perforations in one of the carrier plates. When the pin-carrying frame descends, its pins will eject the splints from the carrier plate therebeneath into funnel-shaped members 162 secured in a perforated shaker plate, 163. Plate 163 is vibrated by means of a toothed wheel 164 which is also secured to shaft 5, said wheel engaging a depending stud carried by the plate. The vibration of the shaking plate causes the splints to fall through the members 162 into the recesses formed in a conveyer belt 165, whence they are carried to a box-filling machine. Finally, the empty carrier plates are successively inverted by a reversing mechanism 166 and deposited upon the track in position to be fed along the track toward the filling mechanism by the action of the feeding rod 15, whereupon their cycle of movements recommences.

What is claimed is:

1. A machine for the continuous manufacture of matches, comprising, in combination, a series of perforated splint-carrying plates arranged to travel in an endless circuit, frames arranged to receive said plates during a portion of their travel, said frames having means for guiding the splints into the perforations in the carrier plates and for holding the splints in parallel relation, means for inserting the plates in said frames, additional means for removing the plates from the frames, a series of separate mechanisms for imparting the necessary treatments to the splints, a series of interconnected shafts, means for driving said shafts, and devices operatively connected with said shafts for feeding the plates to the various mechanisms.

2. In a machine for the continuous manufacture of matches, the combination of perforated, splint-carrying plates arranged to travel in an endless circuit, and frames adapted to carry said plates during a portion of their travel, said frames being open at one side to permit the insertion of said plates therein, and having means for guiding the splints into the perforations in the carrier plates and for holding the splints in parallel relation.

3. In a machine for the continuous manufacture of matches, the combination of a track, perforated splint-carrying plates arranged to travel thereon, frames adapted to receive said plates during a portion of their travel, said frames having means for guiding the splints into the perforations in the carrier plates and for holding the splints in parallel relation, a drive shaft, a feeding rod, connecting devices between said shaft and rod for reciprocating the latter, a frame holder adapted to receive the frames, and means connected to said rod for imparting the movement thereof in one direction to the frames in the holder.

4. In a machine for the continuous manufacture of matches, the combination of a track, perforated splint-carrying plates arranged to travel thereon, frames adapted to carry said plates during a portion of their travel, said frames having means for guiding the splints into the perforations in the carrier plates and for holding the splints in parallel relation, a drive shaft, a feeding rod, connecting devices between said shaft and rod for reciprocating the latter, means carried by said rod for engaging the carrier plates during the movement of the rod in one direction, and additional means carried by the rod for engaging said frames during the movement of the rod in the reverse direction.

5. In a machine for the manufacture of matches, the combination of a track, perforated splint-carrying plates, frames arranged to travel on said track and to receive said plates, said frames having means for guiding the splints into the perforations in the carrier plates and for holding the splints in parallel relation, a filling mechanism, a rocking frame holder adapted to receive said frame, means for removing a frame bodily from the track and for inserting it in the holder, means for rocking said holder, to bring said frames into operative position with respect to said filling mechanism, yielding means for retaining said frames in said holder, means for removing a frame bodily from said holder and for depositing it upon said track, and means carried by the last-mentioned means for releasing said retaining means.

6. In a machine for the manufacture of matches, the combination of a track, perforated splint-carrying plates, frames arranged to travel on said track and to receive said plates, said frames having means for guiding the splints into the perforations in the carrier plates and for holding the splints in parallel relation, a filling mechanism, a frame holder adapted to receive said frames, levers for removing a frame bodily from the track and for inserting it in the holder, means for moving said holder, to bring said frames into operative position with respect to said filling mechanism, spring-pressed devices for retaining said frames in said holder, arms for removing a frame bodily from said holder, and for depositing it upon said track, and means carried by said arms for releasing said retaining means.

7. In a machine for the manufacture of matches, the combination of a track, perforated splint-carrying plates, frames arranged to travel on said track and to receive said plates, said frames having means for guiding the splints into the perforations in the carrier plates and for holding the splints in parallel relation, a shaft, a filling mechanism, a rocking frame holder adapted to receive said frames, a cam secured to said shaft, levers for removing a frame bodily from the track and for inserting it in the holder, arms for removing a frame bodily from said holder and for depositing it upon said track, a system of levers operated by said cam for rocking said holder to bring said frames into operative position with respect to said filling mechanism and for operating said first mentioned levers and said arms, a reciprocatory rod, means carried by said rod for advancing the frames in said holder during the movement of the rod in one direction, and additional means carried by said rod for advancing the frames upon said track during the movement of the rod in the opposite direction.

8. In a machine for the manufacture of matches, the combination of splint magazines, a support located in front thereof, a series of perforated plates arranged in said support, a series of vertical splint-carrying members located in said magazines, means for reciprocating said members and mechanism for inserting the splints carried by said members in the perforations in said plates between reciprocations of said members.

9. In a machine for the manufacture of matches, the combination of splint magazines, a support located in front thereof, a series of perforated plates arranged in said support, a series of vertical splint-carrying members located in said magazines, means connected to said support for retaining the splints in proper position with respect to said members, a drive shaft, a driven shaft, a block to which said members are connected, eccentrics carried by the driven shaft and loosely connected with said block, for reciprocating said members, means actuated by the drive shaft for intermittently raising said block out of operative position with respect to said eccentrics for terminating the reciprocation of said members, and mechanism for inserting the splints carried by said members in the perforations in said plates when said members are inoperative.

10. In a machine for the continuous manufacture of matches, the combination of a track, frames arranged to travel thereon, perforated carrier plates, carried by the frames, said frames having means for guiding the splints into the perforations in the carrier plates and for holding the splints in parallel relation, splint magazines, a frame holder arranged in front thereof for supporting said frames in operative position with respect to said magazines, means for removing a frame bodily from the track and inserting it in said holder, reciprocatory splint-carrying members located in said magazines, means for advancing the frames in said holder, mechanism for inserting the splints carried by said members in the perforations in said plates, means for removing a frame bodily from said holder and depositing it upon said track, and a lever system for operating both sets of removing means.

11. In a machine for the manufacture of matches, the combination of a track having a portion thereof cut away, a presser plate located beneath said cut away portion, perforated splint-carrier plates, recessed frames arranged to travel upon said track and to receive said plates, said frames having means for guiding the splints into the perforations in the carrier plates and for holding the splints in parallel relation, a reciprocatory member for bringing said frames in position above the presser plate, and bars extending through the recesses in said frames for removing from said frames the plates carried thereby.

12. In a machine for the manufacture of matches, the combination of a track, a presser plate, arranged in the track, splint-carrier plates, means for advancing said carrier plates along the track and depositing the same upon the presser plate, a swinging frame for feeding the carrier plates from said presser plate upon the track, mechanism for inverting said carrier plates, said mechanism including fingers, a shaft, and means driven by said shaft for engaging and releasing said fingers with and from said plates.

13. In a machine for the continuous manufacture of matches, the combination of a track, splint-carrier plates, a feeding frame for advancing said plates along the track, mechanism for successively inverting said plates, a paraffining trough, adjustable devices attached to said trough for supporting the carrier plates successively delivered thereupon by said feeding frame, additional mechanism for removing a carrier plate supported upon said devices and for inverting said plate and depositing it upon the track, and means carried by said feeding frame for further advancing the plates.

14. In a machine for the manufacture of matches, the combination of a track, splint-carrier plates, mechanism for feeding said carrier plates along the track, a dipping mechanism arranged in said track and including a paste plate and a device movable thereacross, said device comprising separate scraper and spreader members, said scraper being movable relatively to said spreader, means for imparting a reciprocatory movement to said device, rockers connected with said scraper, and means arranged in the path of said rockers, for operating the latter, to raise the scraper when said device moves in one direction, and to lower said scraper during the movement of said device in the opposite direction.

15. In a machine for the manufacture of matches, the combination of a track, splint-carrier plates, mechanism for feeding said carrier plates along the track, a dipping mechanism arranged in said track and including a paste plate and a device movable thereacross, said device comprising separate scraper and spreader members, said scraper being arranged for vertical movement relatively to said spreader, means for imparting a reciprocatory movement to said device, means for raising the scraper into inoperative position when said device moves in one direction, and means for lowering said scraper into operative position during the movement of said device in the opposite direction.

16. In a machine for the manufacture of matches, the combination of a track, splint-carrier plates, mechanism for feeding said carrier plates along the track, a dipping mechanism arranged in said track and including a paste plate and a device movable thereacross, said device comprising separate scraper and spreader members, said scraper being arranged for vertical movement relatively to said spreader, means for imparting a reciprocatory movement to said device, rockers connected with the scraper, and means located at opposite ends of said mechanism in the path of said rockers, for operating the latter, to raise the scraper when said device moves in one direction, and to lower said scraper during the movement of said device in the opposite direction.

17. In a machine for the manufacture of matches, a dipping mechanism comprising a paste plate, supply and collecting tanks located at opposite sides of said plate, a conduit connecting said tanks and leading downward from the collecting tank to the supply tank, a device movable across said plate and consisting of separate scraper and spreader members, said scraper being arranged for movement relatively to said spreader, means for periodically supplying paste from said supply tank to said device, means for imparting a reciprocatory movement to said device, means for raising said scraper into inoperative position when said device moves toward the supply tank, and means for lowering said scraper into operative position during the movement of said device toward the collecting tank to strip the layer of paste from said plate and carry said layer into said collecting tank; in combination with means for feeding splint-carrier plates to said dipping mechanism.

18. In a machine for the manufacture of matches, the combination of a track, splint-carrier plates arranged to travel thereon, a drive shaft, a drier arranged in the track and provided with a series of communicating chambers, plate-supporting frames located in said drier and adapted to receive said plates, mechanism connected with said shaft for feeding said plates along said track and into the frames in said drier, frame carriers arranged within certain of said chambers, a plurality of driven shafts connected with the drive shaft, means carried by the driven shafts for vertically reciprocating said carriers, a rocking lever carried by one of said driven shafts, an eccentric carried by said drive shaft and engaged with said driven shaft for rocking said lever, lever systems operatively connected with said rocking lever for shifting said frames through said chambers from one carrier to another, means carried by said driven shaft for intermittently disengaging said eccentric from said rocking lever, and devices carried by said carriers for supporting said frames at intervals.

19. In a machine for the continuous manufacture of matches, the combination of a rectangular track, a press arranged at one corner thereof, splint-carrying plates arranged for movement along the track, plate-reversing mechanisms located at the other three corners of said track, shafts arranged below the track, and feeding mechanisms operatively connected with said shafts for advancing said carrier plates along the track.

20. In a machine for the continuous manufacture of matches, the combination of a rectangular track, splint-carrying plates, frames adapted to carry said plates during a portion of their travel, a frame holder, means for inserting the frames into the frame holder, additional means for removing said frames therefrom, a feeding rod for advancing the frames in the frame holder and on the track in different directions, a press arranged at one point in the track, a feeding frame, mechanism for removing said plates from one side of the track, inverting them and depositing them upon another side of the track, and feeding rods for advancing the carrier plates.

In testimony whereof I have hereunto set my hand in presence of two subscribing witnesses.

ANDERS PAULSON.

Witnesses:
LEONARD KOOT,
AUGUST F. W. HAACK.

Copies of this patent may be obtained for five cents each, by addressing the "Commissioner of Patents, Washington, D. C."